(12) United States Patent
Schoenhaber et al.

(10) Patent No.: US 11,291,952 B2
(45) Date of Patent: Apr. 5, 2022

(54) SINGLE-LAYER 3-WAY CATALYTIC CONVERTER

(71) Applicant: UMICORE AG & CO. KG, Hanau-Wolfgang (DE)

(72) Inventors: Jan Schoenhaber, Darmstadt (DE); Martin Roesch, Rodgau (DE); Joerg-Michael Richter, Frankfurt (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 16/954,637

(22) PCT Filed: Dec. 19, 2018

(86) PCT No.: PCT/EP2018/085962
§ 371 (c)(1),
(2) Date: Aug. 18, 2020

(87) PCT Pub. No.: WO2019/121995
PCT Pub. Date: Jun. 27, 2019

(65) Prior Publication Data
US 2021/0069678 A1    Mar. 11, 2021

(30) Foreign Application Priority Data

Dec. 19, 2017 (EP) .................. 17208615.9

(51) Int. Cl.
| | |
|---|---|
| *B01D 53/94* | (2006.01) |
| *B01J 23/10* | (2006.01) |
| *B01J 23/46* | (2006.01) |
| *B01J 35/04* | (2006.01) |
| *F01N 3/10* | (2006.01) |
| *F01N 3/28* | (2006.01) |
| *B01J 23/63* | (2006.01) |
| *B01J 35/00* | (2006.01) |

(Continued)

(52) U.S. Cl.
CPC ....... *B01D 53/945* (2013.01); *B01D 53/9468* (2013.01); *B01J 21/066* (2013.01); *B01J 23/10* (2013.01); *B01J 23/464* (2013.01); *B01J 23/63* (2013.01); *B01J 35/0006* (2013.01); *B01J 35/04* (2013.01); *F01N 3/035* (2013.01); *F01N 3/101* (2013.01); *F01N 3/28* (2013.01); *F01N 3/2825* (2013.01); *B01D 2255/1021* (2013.01); *B01D 2255/1023* (2013.01); *B01D 2255/1025* (2013.01); *B01D 2255/2061* (2013.01); *B01D 2255/2063* (2013.01); *B01D 2255/2065* (2013.01); *B01D 2255/2066* (2013.01); *B01D 2255/2092* (2013.01); *B01D 2255/20715* (2013.01); *B01D 2255/407* (2013.01); *B01D 2255/908* (2013.01); *B01D 2255/9022* (2013.01); *B01D 2255/9155* (2013.01); *B01D 2258/014* (2013.01); *F01N 2330/06* (2013.01); *F01N 2330/30* (2013.01); *F01N 2370/02* (2013.01); *F01N 2510/06* (2013.01); *F01N 2510/0684* (2013.01)

(58) Field of Classification Search
CPC ...... F01N 3/035; F01N 3/101; F01N 2250/02; B01D 46/2418; B01D 53/9445; B01D 53/945; B01D 53/9468; B01D 2255/102; B01D 2255/2065; B01D 2255/407; B01D 2255/9022; B01D 2255/908; B01D 2255/9155; B01D 2258/014; B01J 23/10; B01J 23/40
See application file for complete search history.

(56) References Cited

U.S. PATENT DOCUMENTS

| | | |
|---|---|---|
| 6,228,799 B1 | 5/2001 | Aubert et al. |
| 6,294,140 B1 | 9/2001 | Mussmann et al. |
| 6,348,430 B1 | 2/2002 | Lindner et al. |

(Continued)

FOREIGN PATENT DOCUMENTS

| | | |
|---|---|---|
| CN | 100427205 C | 10/2008 |
| CN | 104785257 A | 7/2015 |

(Continued)

OTHER PUBLICATIONS

DIN 66132: Bestimmung der spezifischen Oberfläche von Feststoffen durch Stickstoffadsorption; Einpunkt-Differenzverfahren nach Haul und Dümbgen. [Determination of specific surface area of solids by adsorption of nitrogen; single-point differential method according to Haul and Dümbgen.] Standard by Deutsches Institut Fur Normung E. V. [German National Standard], 1975. 5 pages in German (with English machine translation).

(Continued)

*Primary Examiner* — Timothy C Vanoy

(74) *Attorney, Agent, or Firm* — Smith, Gambrell & Russell, LLP

(57) ABSTRACT

The invention relates to a catalytic converter for removing carbon monoxide, hydrocarbons and nitrogen oxides from the exhaust gas of internal combustion engines operated with stoichiometric air-fuel mixture, which catalytic converter comprises a substrate of the length L and a catalytic coating, characterized in that the coating is located on the walls of the substrate and extends, proceeding from one end of the substrate, over a length corresponding to at least 50% of L and comprises active aluminum oxide, two cerium/zirconium/rare-earth-metal mixed oxides different from each other, and at least one platinum group metal.

17 Claims, 1 Drawing Sheet

(51) Int. Cl.
    *B01J 21/06*     (2006.01)
    *F01N 3/035*     (2006.01)

(56) References Cited

U.S. PATENT DOCUMENTS

| | | | |
|---|---|---|---|
| 6,663,588 B2 | 12/2003 | DuBois et al. | |
| 7,964,527 B2 | 6/2011 | Larcher et al. | |
| 8,007,750 B2 | 8/2011 | Chen et al. | |
| 8,066,963 B2 | 11/2011 | Klingmann et al. | |
| 8,397,488 B2 | 3/2013 | Woerz et al. | |
| 8,640,440 B2 | 2/2014 | Klingmann et al. | |
| 8,663,588 B2 | 3/2014 | Lindner et al. | |
| 8,956,994 B2 | 2/2015 | Ifrah et al. | |
| 9,156,023 B2 | 10/2015 | Klingmann et al. | |
| 9,174,198 B2 | 11/2015 | Kawabata et al. | |
| 9,238,982 B2 | 1/2016 | Springer et al. | |
| 9,266,092 B2 | 2/2016 | Arnold et al. | |
| 9,517,462 B2 | 12/2016 | Roesch et al. | |
| 10,413,886 B2 | 9/2019 | Despres et al. | |
| 2004/0065078 A1 | 4/2004 | Schafer-Sindlinger et al. | |
| 2006/0142151 A1* | 6/2006 | Taki | B01D 53/945 |
| | | | 502/304 |
| 2007/0093381 A1 | 4/2007 | Miyoshi et al. | |
| 2008/0090723 A1 | 4/2008 | Okamoto et al. | |
| 2010/0055012 A1 | 3/2010 | Grisstede et al. | |
| 2010/0275579 A1 | 11/2010 | Klingmann et al. | |
| 2010/0319332 A1 | 12/2010 | Jeske et al. | |
| 2011/0094207 A1 | 4/2011 | Woerz et al. | |
| 2013/0143732 A1 | 6/2013 | Aoki | |
| 2014/0140899 A1 | 5/2014 | Gabrielsson et al. | |
| 2017/0304773 A1 | 10/2017 | Onoe et al. | |
| 2017/0368536 A1 | 12/2017 | Depres et al. | |
| 2018/0178198 A1 | 6/2018 | Deeba et al. | |
| 2020/0094189 A1 | 3/2020 | Deibel et al. | |
| 2020/0188887 A1 | 6/2020 | Kobayashi et al. | |
| 2020/0306693 A1 | 10/2020 | Schoenhaber et al. | |
| 2020/0316565 A1 | 10/2020 | Fisher et al. | |
| 2021/0079822 A1 | 3/2021 | Schoenhaber et al. | |
| 2021/0086135 A1 | 3/2021 | Schoenhaber et al. | |

FOREIGN PATENT DOCUMENTS

| | | |
|---|---|---|
| DE | 10 2011 050 788 A1 | 12/2012 |
| DE | 11 2013 002 163 T5 | 1/2015 |
| EP | 0 855 650 A2 | 12/1998 |
| EP | 0 885 650 A2 | 12/1998 |
| EP | 1 046 423 A2 | 10/2000 |
| EP | 1 657 410 A2 | 5/2006 |
| EP | 1 726 359 A1 | 11/2006 |
| EP | 1 974 809 A1 | 10/2008 |
| EP | 2 042 225 A1 | 4/2009 |
| EP | 2 042 226 A2 | 4/2009 |
| EP | 1 974 810 B1 | 8/2010 |
| EP | 2 322 773 A1 | 5/2011 |
| EP | 2 650 042 A1 | 10/2013 |
| EP | 1 541 220 B1 | 2/2014 |
| EP | 2 948 653 A1 | 12/2015 |
| EP | 3 045 226 A1 | 7/2016 |
| EP | 3 162 428 A1 | 5/2017 |
| EP | 3 205 388 A1 | 8/2017 |
| EP | 3 207 977 A1 | 8/2017 |
| EP | 3 207 978 A1 | 8/2017 |
| EP | 3 207 987 A1 | 8/2017 |
| EP | 3 207 989 A1 | 8/2017 |
| EP | 3 207 990 A1 | 8/2017 |
| EP | 3 247 493 A1 | 11/2017 |
| EP | 3 406 322 A1 | 11/2018 |
| FR | 3 020 091 A1 | 10/2015 |
| JP | 2016-203116 A | 12/2016 |
| WO | 95/35152 | 12/1995 |
| WO | 2008/000449 A2 | 1/2008 |
| WO | 2014/178633 A1 | 11/2014 |
| WO | 2017/109514 A1 | 6/2017 |
| WO | 2017/209083 A1 | 12/2017 |

OTHER PUBLICATIONS

International Preliminary Report on Patentability dated Jun. 23, 2020 for International Patent Application No. PCT/EP2018/085962 (7 pages in German with English translation).
European Search Report dated Jun. 4, 2018 for European Application No. 17208615.9 (8 pages).
Von Johann Siebler, et al. MTZ Motortechnische Zeitschrift [Katalysatorprüfung] 1994, 55, pp. 214-218.
Non Final Office Action dated Jun. 18, 2021 in U.S. Appl. No. 16/954,305 (8 pages).
Non Final Office Action dated May 28, 2021 in U.S. Appl. No. 16/954,323 (24 pages).
Non Final Office Action dated Jun. 21, 2021 in U.S. Appl. No. 16/954,628 (7 pages).
International Search Report for PCT/EP2018/085962, dated Feb. 18, 2019 (4 pgs. with English translation).
Written Opinion of the International Searching Authority for PCT/EP2018/085962, dated Feb. 18, 2019 (6 pgs.).
Wikipedia https://de.wikipedia.org/wiki/Partikelgr%C3%B6%C3%9Fenverteilung Mar. 2019 "Partikelgrößenverteilung (Particle Size Distribution)" (14 pgs. with English Translation).

* cited by examiner

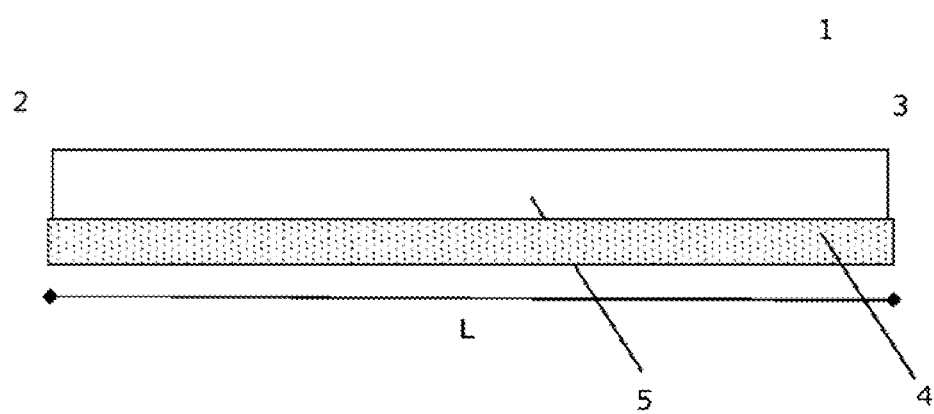

SINGLE-LAYER 3-WAY CATALYTIC CONVERTER

The present invention relates to a three-way catalytic converter that is particularly suitable for removing carbon monoxide, hydrocarbons and nitrogen oxides from the exhaust gas of combustion engines operated with stoichiometric air-fuel mixture. It is characterized in that it has a high oxygen storage capacity after aging and consists only of a single catalytically active layer.

Exhaust gases from combustion engines, i.e., gasoline- or natural gas-fueled engines, operated with stoichiometric air-fuel mixtures are cleaned in conventional methods with the aid of three-way catalytic converters. Such catalytic converters are capable of simultaneously converting the three major gaseous pollutants of the engine, namely hydrocarbons, carbon monoxide and nitrogen oxides, into harmless components. Stoichiometrically means that on average exactly as much air is available for combustion of the fuel present in the cylinder as is required for complete combustion. The combustion air ratio λ (A/F ratio; air/fuel ratio) sets the air mass $m_{L,actual}$ which is actually available for combustion in relation to the stoichiometric air mass $m_{L,st}$:

$$\lambda = \frac{m_{L,actual}}{m_{L,st}}$$

If λ<1 (e.g., 0.9), this means "air deficiency" and one speaks of a rich exhaust gas mixture; λ>1 (e.g., 1.1) means "excess air" and the exhaust gas mixture is referred to as lean. The statement λ=1.1 means that 10% more air is present than would be required for the stoichiometric reaction.

In general, platinum group metals are used as catalytically active materials, particularly, platinum, palladium, and rhodium, which are, for example, present on y aluminum oxide as support material. In addition, three-way catalytic converters contain oxygen-storing materials, e.g., cerium/zirconium mixed oxides. In the latter case, cerium oxide, a rare earth metal oxide, constitutes the component that is fundamental to the oxygen storage. Along with zirconium oxide and cerium oxide, these materials may contain additional components, such as further rare earth metal oxides or alkaline earth metal oxides. Oxygen-storing materials are activated by applying catalytically active materials, such as platinum group metals, and therefore also serve as support material for the platinum group metals.

The components of a three-way catalytic converter may be present in a single coating layer on an inert catalyst support. Such catalytic converters are distinguished by lower coating costs compared to multilayer catalytic converters.

EP1541220B1 describes a monolayer three-way catalytic converter in which palladium and rhodium are predominantly present in a non-alloyed form.

EP1974810B1 describes a monolayer three-way catalytic converter in which a first cerium/zirconium mixed oxide is activated with rhodium and a second cerium/zirconium mixed oxide is activated with palladium, the first cerium/zirconium mixed oxide having a higher zirconium oxide content than the second.

EP2948653A1 describes a monolayer three-way catalytic converter in which a temperature-resistant metal oxide and optionally a first cerium/zirconium mixed oxide is activated with rhodium and a second cerium/zirconium mixed oxide is activated with palladium, the proportion of cerium/zirconium mixed oxides in the layer being the same or greater than that of the temperature-resistant metal oxide in the layer.

The present invention relates to a three-way catalytic converter for removing carbon monoxide, hydrocarbons and nitrogen oxides from the exhaust gas of combustion engines operated with stoichiometric air-fuel mixture, in particular combustion engines with intake manifold injection, comprising a ceramic through-flow substrate of length L and a catalytic coating, wherein the coating is located on the walls of the substrate and extends from one end of the substrate over a length of at least 50% of L and comprises active aluminum oxide, at least two cerium/zirconium/rare earth metal mixed oxides that differ from one another and at least one platinum group metal.

Surprisingly, it has been found that a combination of certain different cerium/zirconium/rare earth metal mixed oxides can bring about a greatly improved conversion of gaseous pollutants after hard aging.

BRIEF DESCRIPTION OF THE DRAWING

FIG. 1 shows a catalytic converter according to the invention

The coating is catalytically active, in particular at operating temperatures of 250° C. to 1100° C. It usually contains one or more precious metals which are fixed on one or more support materials and two oxygen storage components which differ from one another. The oxygen storage components differ with respect to at least one of the components contained. Equal components of the oxygen storage materials may be present in equal or different amounts.

Cerium/zirconium/rare earth metal mixed oxides are particularly suitable as oxygen storage components. The term "cerium/zirconium/rare earth metal mixed oxide" within the meaning of the present invention excludes physical mixtures of cerium oxide, zirconium oxide and rare earth oxide. Rather, "cerium/zirconium/rare earth metal mixed oxides" are characterized by a largely homogeneous, three-dimensional crystal structure that is ideally free of phases of pure cerium oxide, zirconium oxide or rare earth oxide. Depending on the manufacturing process, however, not completely homogeneous products which have however a homogeneity of >80% by weight may arise which can generally be used without any disadvantage.

In all other respects, the term "rare earth metal" or "rare earth metal oxide" within the meaning of the present invention does not include cerium or cerium oxide.

Lanthanum oxide, yttrium oxide, praseodymium oxide, neodymium oxide and/or samarium oxide can, for example, be considered as rare earth metal oxides in the cerium/zirconium/rare earth metal mixed oxides.

Lanthanum oxide, yttrium oxide, and/or praseodymium oxide are preferred, and lanthanum oxide and yttrium oxide, yttrium oxide and praseodymium oxide, and lanthanum oxide and praseodymium oxide are very particularly preferred.

In embodiments of the present invention, the oxygen storage components are preferably free from neodymium oxide.

In embodiments of the present invention, in the coating, the weight ratio of aluminum oxide to the sum of the two cerium/zirconium/rare earth metal mixed oxides is in the range from 10:90 to 60:40, preferably in the range from 20:80 to 50:50 and particularly preferably in the range from 25:75 to 35:65. In preferred embodiments, the coating comprises in each case lanthanum-stabilized aluminum oxide in amounts of 10 to 60% by weight, preferably 20 to 50% by weight, particularly preferably 25 to 35% by weight, and oxygen storage components in amounts of 40 to 90% by weight, preferably 50 to 80% by weight, particularly preferably 65 to 75% by weight, in each case based on the sum of the weights of aluminum oxide and oxygen storage components in the coating.

In embodiments, the coating preferably comprises two oxygen storage components different from one another, wherein the weight ratio of the first cerium/zirconium/rare earth metal mixed oxide to the second cerium/zirconium/rare earth metal mixed oxide is in the range from 4:1 to 1:4, preferably in the range from 3:1 to 1:3 and particularly preferably in the range from 2:1 to 1:2.

In embodiments of the present invention, the coating comprises a first and a second oxygen storage component, wherein the first oxygen storage component has a higher zirconium oxide content than the second oxygen storage component.

In accordance with the invention, the cerium oxide to zirconium oxide mass ratio in the cerium/zirconium/rare earth metal mixed oxides can vary within wide limits. It amounts to, for example, 0.1 to 1.5, preferably 0.2 to 1.25 or 0.3 to 1. It is furthermore preferred for the first oxygen storage component to have a cerium oxide to zirconium oxide weight ratio of 0.7 to 0.1, which is smaller than in the second cerium/zirconium/rare earth metal mixed oxide, which has a cerium oxide to zirconium oxide weight ratio of 0.5 to 1.5. Other more preferred embodiments include a first oxygen storage component having a cerium oxide to zirconium oxide weight ratio of 0.6 to 0.2 and a second oxygen storage component having a cerium oxide to zirconium oxide weight ratio of 0.6 to 1.2. Still other most preferred embodiments include a first oxygen storage component having a cerium oxide to zirconium oxide weight ratio of 0.5 to 0.3, and the second oxygen storage component has a cerium oxide to zirconium oxide weight ratio of 0.7 to 1.0.

In a preferred embodiment, the three-way catalytic converter according to the invention is designed such that the first cerium/zirconium/rare earth metal mixed oxide has a cerium oxide content of 10% to 40% based on the weight of the first cerium/zirconium/rare earth metal mixed oxide, more preferably of 15% to 35% and very particularly preferably of 20% to 30% based on the weight of the first cerium/zirconium/rare earth metal mixed oxide.

In contrast, the zirconium oxide content in the first cerium/zirconium/rare earth metal mixed oxide is 40% to 90% based on the weight of the first cerium/zirconium/rare earth metal mixed oxide. It is advantageous if the zirconium oxide content in the first cerium/zirconium/rare earth metal mixed oxide is between 50% and 75%, very preferably 55% to 65%, based on the weight of the first cerium/zirconium/rare earth metal mixed oxide.

Likewise, a cerium oxide content of 25% to 60% based on the weight of the second cerium/zirconium/rare earth metal mixed oxide should prevail in the second cerium/zirconium/rare earth metal mixed oxide. It is more advantageous if in the second cerium/zirconium/rare earth metal mixed oxide, there is a cerium oxide content of 30% to 55%, very preferably 35% to 50%, based on the weight of the second cerium/zirconium/rare earth metal mixed oxide.

In a further preferred embodiment, the second cerium/zirconium/rare earth metal mixed oxide has a zirconium oxide content of 20% to 70% based on the weight of the second cerium/zirconium/rare earth metal mixed oxide. It is more preferred here if the second cerium/zirconium/rare earth metal mixed oxide has a zirconium oxide content of 30% to 60% and very particularly preferably of 40% to 55%, based on the weight of the second cerium/zirconium/rare earth metal mixed oxide.

It is preferred according to the invention if both cerium/zirconium/rare earth metal mixed oxides are doped with lanthanum oxide so that the content of lanthanum oxide is preferably >0% to 10% based on the weight of the cerium/zirconium/rare earth metal mixed oxide. Particularly advantageously, these lanthanum oxide-containing oxygen storage components have a lanthanum oxide to cerium oxide mass ratio of 0.05 to 0.5.

In embodiments of the present invention, the coating comprises lanthanum-stabilized aluminum oxide as well as rhodium, palladium or palladium and rhodium and two different oxygen storage components comprising zirconium oxide, cerium oxide, lanthanum oxide and yttrium oxide or praseodymium oxide.

The first cerium/zirconium/rare earth metal mixed oxide is preferably doped with yttrium oxide in addition to lanthanum oxide. A preferred catalytic converter has an yttrium oxide content in the first cerium/zirconium/rare earth metal mixed oxide of 2% to 25% based on the weight of the first cerium/zirconium/rare earth metal mixed oxide. More preferably, the yttrium oxide content of the first cerium/zirconium/rare earth metal mixed oxide is between 4% and 20%, very preferably 10% to 15%, based on the weight of the first cerium/zirconium/rare earth metal mixed oxide.

An embodiment in which the second cerium/zirconium/rare earth metal mixed oxide is doped not only with lanthanum oxide but also with a further metal oxide from the group of rare earth metal oxides, preferably with praseodymium, is also advantageous. The content of the second rare earth metal in the second cerium/zirconium/rare earth metal mixed oxide may be between 2% and 15% based on the weight of the second cerium/zirconium/rare earth metal mixed oxide. It is more advantageous if the content of the second rare earth metal of the second cerium/zirconium/rare earth metal mixed oxide is 3% to 10%, very preferably 4% to 8%, based on the weight of the second cerium/zirconium/rare earth metal mixed oxide.

In the coating, the yttrium oxide content of the first oxygen storage component is in particular 5 to 15% by weight based on the weight of the oxygen storage component. The lanthanum oxide to yttrium oxide weight ratio is in particular 0.1 to 1, preferably 0.15 to 0.8 and very preferably 0.2 to 0.5.

In the coating, the praseodymium content of the second oxygen storage component is in particular 2 to 10% by weight based on the weight of the oxygen storage component. The lanthanum oxide to praseodymium oxide weight ratio is in particular 0.1 to 2.0, preferably 0.2 to 1.8 and very preferably 0.5 to 1.5.

In embodiments of the present invention, in the coating, the zirconium oxide content of the yttrium oxide-containing oxygen storage component is greater than the zirconium oxide content of the praseodymium oxide-containing oxygen storage component, in each case based on the respective oxygen storage component.

In one embodiment, the coating contains precious metals as catalytically active elements. Platinum, palladium and rhodium or mixtures thereof are particularly suitable for this purpose, palladium, rhodium, palladium and rhodium, or platinum, palladium and rhodium being preferred, and palladium and rhodium being particularly preferred. Furthermore, both cerium/zirconium/rare earth metal mixed oxides may be activated with palladium and rhodium, platinum and rhodium or platinum, palladium and rhodium.

The catalytically active coating is located on the walls in the channels of the through-flow substrate. If, in the context of the present invention, a coating on the walls is mentioned, this means that only a small proportion of the coating of at most 20% by weight, more preferably at most 15% by weight and very particularly preferably at most 10% by weight, and most preferably at most 5% by weight is present in the walls of the through-flow substrate.

Honeycomb bodies which are made from ceramic or metal and which have a volume V and parallel flow channels for the exhaust gases of the combustion engine are suitable as catalytically inert catalyst supports. According to the invention, the catalytically active coating is located on the walls in the channels of a through-flow substrate. Ceramic honeycomb bodies that can be used according to the present invention are known through-flow substrates and obtainable on the market. They consist, for example, of silicon carbide, aluminum titanate or cordierite and, for example, have a cell density of 200 to 900 cells per square inch (cpsi) and usually a wall thickness of between 2 and 12 mil, or 0.051 and 0.305 mm.

The precious metals are usually used in amounts of 0.1 g/l to 15 g/l, based on the volume of the ceramic honeycomb body, preferably 0.15 g/l to 10 g/l. In a preferred embodiment, the precious metals are present in equal measure both on the aluminum oxide and on the oxygen storage components.

All materials familiar to the person skilled in the art for this purpose may be used as support materials for the precious metals. Such materials are in particular metal oxides with a BET surface area of 30 to 250 m$^2$/g, preferably 100 to 200 m$^2$/g (determined according to DIN 66132—latest version as of filing date).

Particularly suitable support materials for the precious metals are selected from the series consisting of aluminum oxide, doped aluminum oxide, silicon oxide, titanium dioxide and mixed oxides of one or more of these.

Doped aluminum oxides are, for example, aluminum oxides doped with lanthanum oxide, barium oxide, zirconium oxide and/or titanium oxide. Lanthanum-stabilized aluminum oxide is advantageously used, wherein lanthanum is used in quantities of 1 to 10% by weight, preferably 3 to 6% by weight, in each case calculated as $La_2O_3$ and based on the weight of the stabilized aluminum oxide.

The coating usually contains oxygen storage components in amounts of 30 to 225 g/l, based on the volume of the honeycomb body, preferably 40 to 200 g/l and particularly preferably 50 to 160 g/l.

The mass ratio of support materials and oxygen storage components in the coating is usually preferably 0.2 to 1.5, for example 0.3 to 0.8.

The term, "active aluminum oxide," is known to the person skilled in the art. It particularly describes y aluminum oxide with a surface of 100 to 200 m$^2$/g. Active aluminum oxide is frequently described in the literature and is commercially available.

In embodiments of the present invention, the coating contains one or more alkaline earth compounds, such as strontium oxide, barium oxide or barium sulfate. The amount of barium sulfate per coating is, in particular, 2 to 20 g/l volume of the ceramic honeycomb body.

The coating contains, in particular, strontium oxide or barium oxide.

In further embodiments of the present invention, the coating contains additives, such as rare earth compounds, for example lanthanum oxide, and/or binders, such as aluminum compounds. These additives are used in quantities that can vary within wide limits and that the person skilled in the art can determine in the specific case by simple means.

According to the present invention, the coating extends from the first end of the ceramic honeycomb body over at least 50%, preferably at least 70% and very preferably 100% of the length L of the substrate. The loading of the substrate with the catalytic coating is 40 g/l to 300 g/l, based on the volume of the support, preferably 50 g/l to 260 g/l and particularly preferably 60 g/l to 220 g/l. The catalyst according to the invention may comprise other types of coatings in a layered or zoned array.

In embodiments of the present invention, the coating does not contain a zeolite or a molecular sieve.

The catalytic converter according to the invention can be produced by methods known to the person skilled in the art, for example by applying a coating suspension, which is usually referred to as washcoat, to the ceramic substrate by means of one of the usual dip coating methods or pump and suction coating methods. Thermal post-treatment or calcination usually follow.

It is known to the person skilled in the art that the average particle size of the catalytically active materials has to be matched to the particular ceramic substrate. In embodiments of the present invention, the coating suspensions for producing the coating are ground to a particle size distribution of $d_{50}$=2 to 8 μm, preferably 3 to 7 μm and particularly preferably 4 to 6 μm and of $d_{90}$=7 to 25 μm, preferably 8 to 23 μm and particularly preferably 9 to 20 μm (average particle size $d_{50}$ and $d_{90}$ respectively of the Q3 distribution [https://de.wikipedia.org/wiki/Partikelgr%C3%B6%C3%9Fenverteilung] according to DIN 66160—latest version as of filing date).

The catalytic converter according to the invention is perfectly suitable for removing carbon monoxide, hydrocarbons and nitrogen oxides from the exhaust gas of combustion engines operated with stoichiometric air-fuel mixture.

The present invention thus also relates to a method for removing carbon monoxide, hydrocarbons and nitrogen oxides from the exhaust gas of combustion engines operated with stoichiometric air-fuel mixture, characterized in that the exhaust gas is passed over a catalytic converter according to the invention.

FIG. 1 shows a catalytic converter according to the invention comprising a ceramic substrate (1) of length L and channels which extend in parallel between a first end (2) and a second end (3) of the substrate and are separated by walls (4). The coating (5) is located on the walls of the ceramic substrate (1).

The invention is explained in more detail in the following examples.

EXAMPLES

Three catalytic converters each were provided with different catalytically active coatings. Ceramic through-flow substrates of cordierite having a diameter of 4 inches and a length of 6 inches and a cell density of 600 cpsi and a wall thickness of 4.3 mil were used as substrates. Each catalytic converter was provided with a coating of 161 g/l based on the volume of the ceramic honeycomb body.

Comparative Example 1

Aluminum oxide stabilized with lanthanum oxide was suspended in water together with an oxygen storage component containing 25% by weight cerium oxide, 68% by weight zirconium oxide, 3.5% by weight lanthanum oxide and 4% by weight yttrium oxide. The weight ratio of aluminum oxide to oxygen storage component was 50:50. The suspension thus obtained was then mixed with a palladium nitrate solution and a rhodium nitrate solution under constant stirring. The resulting coating suspension was used directly for coating a commercially available substrate, the coating being applied over 100% of the substrate length. The total load of this catalytic converter amounted to 161 g/l, the precious metal load amounted to 1.509 g/l having a palladium to rhodium ratio of 9:1. The coated catalytic converter thus obtained was dried and then calcined.

Comparative Example 2

Aluminum oxide stabilized with lanthanum oxide was suspended in water together with an oxygen storage component containing 40% by weight cerium oxide, 50% by weight zirconium oxide, 5% by weight lanthanum oxide and 5% by weight praseodymium oxide.

The weight ratio of aluminum oxide to oxygen storage component was 50:50. The suspension thus obtained was then mixed with a palladium nitrate solution and a rhodium nitrate solution under constant stirring. The resulting coating suspension was used directly for coating a commercially available substrate, the coating being applied over 100% of the substrate length. The total load of this catalytic converter amounted to 161 g/l, the precious metal load amounted to 1.509 g/l having a palladium to rhodium ratio of 9:1. The coated catalytic converter thus obtained was dried and then calcined.

Example 1 According to the Invention

Aluminum oxide stabilized with lanthanum oxide was suspended in water together with a first oxygen storage component comprising 40% by weight cerium oxide, 50% by weight zirconium oxide, 5% by weight lanthanum oxide and 5% by weight praseodymium oxide, and a second oxygen storage component comprising 24% cerium oxide, 60% by weight zirconium oxide, 3.5% by weight lanthanum oxide and 12.5% by weight yttrium oxide. Both oxygen storage components were used in equal parts. The weight ratio of aluminum oxide to oxygen storage components was 30:70. The suspension thus obtained was then mixed with a palladium nitrate solution and a rhodium nitrate solution under constant stirring. The resulting coating suspension was used directly for coating a commercially available substrate, the coating being applied over 100% of the substrate length. The total load of this catalytic converter amounted to 161 g/l, the precious metal load amounted to 1.509 g/l having a palladium to rhodium ratio of 9:1. The coated catalytic converter thus obtained was dried and then calcined.

In order to determine the catalytic properties of the catalytic converter according to the invention, a catalytic converter each of Comparative Example 1, Comparative Example 2 and Example 1 was aged in an engine test bench aging. The aging process consists of an overrun cut-off aging process with an exhaust gas temperature of 950° C. before the catalyst input (maximum bed temperature of 1030° C.). The aging time was 38 hours.

Subsequently, an engine test bench was used to test the light-off performance at a constant average air ratio $\lambda$, and the dynamic conversion with changes of $\lambda$ was tested. Table 1 contains the temperatures $T_{50}$ at which 50% of the considered components are respectively converted. In this case, the light-off performance was determined with a stoichiometric exhaust gas composition ($\lambda=0.999$ with ±3.4% amplitude).

TABLE 1

Results of the light-off performance after aging for Example 1 and Comparative Examples 1 and 2

|  | $T_{50}$ HC stoichiometric | $T_{50}$ CO stoichiometric | $T_{50}$ NOx stoichiometric |
| --- | --- | --- | --- |
| Comparative Example 1 | 421 | 433 | 432 |
| Comparative Example 2 | 427 | 436 | 437 |
| Example 1 | 418 | 427 | 427 |

Example 1 according to the invention shows a marked improvement in light-off performance compared to the two comparative examples.

The dynamic conversion performance was determined in a range for $\lambda$ of 0.99 to 1.01 at a constant temperature of 510° C. The amplitude of $\lambda$ in this case amounted to ±6.8%. Table 2 contains the conversion at the point of intersection of the CO and NOx conversion curves, as well as the associated HC conversion.

TABLE 2

Results of the dynamic conversion performance after aging for Example 1 and Comparative Examples 1 and 2

|  | CO/NOx conversion at the point of intersection | HC conversion at $\lambda$ of the CO/NOx point of intersection |
| --- | --- | --- |
| Comparative Example 1 | 73% | 95% |
| Comparative Example 2 | 88% | 97% |
| Example 1 | 95% | 97% |

Example 1 according to the invention shows a marked improvement in the dynamic CO/NOx conversion after aging than the two comparative examples.

OSC Properties:

The oxygen storage capacity was determined in two different experiments. Table 3 shows the values for the lambda step test which characterizes the static oxygen storage capacity. The air/fuel ratio $\lambda$ before the catalytic converter is changed from rich ($\lambda=0.96$) to lean ($\lambda=1.04$). The stored oxygen quantity is calculated from the delay time of the post-cat lambda probe in comparison to the pre-cat lambda probe.

TABLE 3

Static oxygen storage capacity after aging for Example 1 and Comparative Examples 1 and 2

|  | Oxygen storage capacity (mg/l) |
| --- | --- |
| Comparative Example 1 | 132 |
| Comparative Example 2 | 252 |
| Example 1 | 277 |

FURTHER EXAMPLES

Comparative Example 1

Aluminum oxide stabilized with lanthanum oxide was suspended in water together with an oxygen storage component containing 40% by weight cerium oxide, 50% by weight zirconium oxide, 5% by weight lanthanum oxide and 5% by weight praseodymium oxide. The weight ratio of aluminum oxide to oxygen storage component was 30:70. The suspension thus obtained was then mixed with a palladium nitrate solution and a rhodium nitrate solution under constant stirring. The resulting coating suspension was used directly for coating a commercially available substrate, the coating being applied over 100% of the substrate length. The total load of this catalytic converter amounted to 76.27 g/l, the precious metal load amounted to 1.271 g/l having a palladium to rhodium ratio of 5:1. The coated catalytic converter thus obtained was dried and then calcined.

Comparative Example 2

Aluminum oxide stabilized with lanthanum oxide was suspended in water together with an oxygen storage component containing 24% by weight cerium oxide, 60% by weight zirconium oxide, 3.5% by weight lanthanum oxide and 12.5% by weight yttrium oxide. The weight ratio of aluminum oxide to oxygen storage component was 30:70. The suspension thus obtained was then mixed with a palladium nitrate solution and a rhodium nitrate solution under constant stirring. The resulting coating suspension was used directly for coating a commercially available substrate, the coating being applied over 100% of the substrate length. The total load of this catalytic converter amounted to 76.27 g/l, the precious metal load amounted to 1.271 g/l having a palladium to rhodium ratio of 5:1. The coated catalytic converter thus obtained was dried and then calcined.

Example 1 According to the Invention

Aluminum oxide stabilized with lanthanum oxide was suspended in water together with a first oxygen storage component comprising 40% by weight cerium oxide, 50% by weight zirconium oxide, 5% by weight lanthanum oxide and 5% by weight praseodymium oxide, and a second oxygen storage component comprising 24% cerium oxide, 60% by weight zirconium oxide, 3.5% by weight lanthanum oxide and 12.5% by weight yttrium oxide. Both oxygen storage components were used in equal parts. The weight ratio of aluminum oxide to oxygen storage components was 30:70. The suspension thus obtained was then mixed with a palladium nitrate solution and a rhodium nitrate solution under constant stirring. The resulting coating suspension was used directly for coating a commercially available substrate, the coating being applied over 100% of the substrate length. The total load of this catalytic converter amounted to 76.27 g/l, the precious metal load amounted to 1.271 g/l having a palladium to rhodium ratio of 5:1. The coated catalytic converter thus obtained was dried and then calcined.

Dynamic Pressure:

|  | 600 m³/h | 900 m³/h |
| --- | --- | --- |
| Comparative Example 1 | 52.9 mbar ± 0.2 mbar | 107.4 mbar ± 0.3 mbar |
| Comparative Example 2 | 53.3 mbar ± 0.4 mbar | 107.2 mbar ± 0.5 mbar |
| Example 1 | 53.0 mbar ± 0.6 mbar | 105.9 mbar ± 0.6 mbar |

In order to determine the catalytic properties of the catalytic converter according to the invention, a catalytic converter each of Comparative Example 1, Comparative Example 2 and Example 1 was aged in an engine test bench aging. The aging process consists of an overrun cut-off aging process with an exhaust gas temperature of 950° C. before the catalyst input (maximum bed temperature of 1030° C.). The aging time was 19 hours.

Subsequently, an engine test bench was used to test the light-off performance at a constant average air ratio $\lambda$, and the dynamic conversion with changes of $\lambda$ was tested. Table 1 contains the temperatures $T_{50}$ at which 50% of the considered components are respectively converted. In this case, the light-off performance with stoichiometric exhaust gas composition ($\lambda$=0.999 with ±3.4% amplitude) was determined.

TABLE 1

Results of the light-off performance after aging for Example 1 and Comparative Examples 1 and 2

|  | $T_{50}$ HC stoichiometric | $T_{50}$ CO stoichiometric | $T_{50}$ NOx stoichiometric |
| --- | --- | --- | --- |
| Comparative Example 1 | 391 | 399 | 406 |
| Comparative Example 2 | 370 | 377 | 377 |
| Example 1 | 374 | 379 | 379 |

The dynamic conversion performance was determined in a range for $\lambda$ of 0.99 to 1.01 at a constant temperature of 510° C. In so doing, the amplitude of $\lambda$ was ±6.8%. Table 2 contains the conversion at the point of intersection of the CO and NOx conversion curves, as well as the associated HC conversion.

TABLE 2

Results of the dynamic conversion performance after aging for Example 1 and Comparative Examples 1 and 2

|  | CO/NOx conversion at the point of intersection | HC conversion at $\lambda$ of the CO/NOx point of intersection |
| --- | --- | --- |
| Comparative Example 1 | 82% | 96% |
| Comparative Example 2 | 81.5% | 97% |
| Example 1 | 90% | 97% |

Example 1 according to the invention shows a marked improvement in the dynamic CO/NOx conversion after aging, while the light-off performance is similarly good as in Comparative Example 2 but better than in Comparative Example 1.

OSC Properties:

The oxygen storage capacity was determined in two different experiments. Table 3 shows the values for the lambda step test which characterizes the static oxygen storage capacity. The air/fuel ratio $\lambda$ before the catalytic converter is changed from rich ($\lambda$=0.96) to lean ($\lambda$=1.04). The stored oxygen quantity is calculated from the delay time of the post-cat lambda probe in comparison to the pre-cat lambda probe.

TABLE 3

Static oxygen storage capacity after aging for
Example 1 and Comparative Examples 1 and 2

|  | Oxygen storage capacity (mg/l) |
|---|---|
| Comparative Example 1 | 182 |
| Comparative Example 2 | 132 |
| Example 1 | 194 |

In another test, dynamic oxygen storage capacity is determined. At an average value of λ=1, the exhaust gas is subjected to various λ amplitudes with a frequency of 1 Hz. The amplitude signal of the post-cat lambda probe is divided by the amplitude signal of the pre-cat lambda probe. The smaller the value, the better the dynamic oxygen storage capacity. The results are shown in Table 4.

TABLE 4

Dynamic oxygen storage capacity after aging for
Example 1 and Comparative Examples 1 and 2

|  | 2% amplitude | 3.4% amplitude | 6.8% amplitude |
|---|---|---|---|
| Comparative Example 1 | 0.24 | 0.37 | 0.41 |
| Comparative Example 2 | 0.08 | 0.13 | 0.28 |
| Example 1 | 0.09 | 0.14 | 0.23 |

The example according to the invention shows both a high static and a very good dynamic oxygen storage capacity after aging.

The invention claimed is:

1. Catalytic converter for removing carbon monoxide, hydrocarbons and nitrogen oxides from the exhaust gas of internal combustion engines operated with stoichiometric air-fuel mixture, comprising a ceramic through-flow substrate of length L and a catalytic coating, characterized in that
the coating is located on the walls of the substrate and extends from one end of the substrate over a length of at least 50% of L and has active aluminum oxide, at least two cerium/zirconium/rare earth metal mixed oxides that differ from one another and at least one platinum group metal, and the first cerium/zirconium/rare earth metal mixed oxide has a weight ratio of cerium oxide to zirconium oxide of 0.7 to 0.1, which is smaller than in the second cerium/zirconium/rare earth metal mixed oxide, which has a cerium oxide to zirconium oxide weight ratio of 0.5 to 1.5, and wherein both cerium/zirconium/rare earth metal mixed oxides are doped with lanthanum oxide.

2. Catalytic converter according to claim 1, characterized in that the weight ratio of aluminum oxide to the sum of the two cerium/zirconium/rare earth metal mixed oxides is in the range from 10:90 to 60:40.

3. Catalytic converter according to claim 1, characterized in that the weight ratio of the first cerium/zirconium/rare earth metal mixed oxide to the second cerium/zirconium/rare earth metal mixed oxide is in the range from 4:1 to 1:4.

4. Catalytic converter according to claim 1, characterized in that the first cerium/zirconium/rare earth metal mixed oxide has a higher zirconium oxide content than the second cerium/zirconium/rare earth metal mixed oxide.

5. Catalytic converter according to claim 1, characterized in that the first cerium/zirconium/rare earth metal mixed oxide has a cerium oxide content of 10% to 40% based on the weight of the first cerium/zirconium/rare earth metal mixed oxide.

6. Catalytic converter according to claim 1, characterized in that the first cerium/zirconium/rare earth metal mixed oxide has a zirconium oxide content of 40% to 90% based on the weight of the first cerium/zirconium/rare earth metal mixed oxide.

7. Catalytic converter according to claim 1, characterized in that the second cerium/zirconium/rare earth metal mixed oxide has a cerium oxide content of 25% to 60% based on the weight of the second cerium/zirconium/rare earth metal mixed oxide.

8. Catalytic converter according to claim 1, characterized in that the second cerium/zirconium/rare earth metal mixed oxide has a zirconium oxide content of 20% to 70% based on the weight of the second cerium/zirconium/rare earth metal mixed oxide.

9. Catalytic converter according to claim 1, characterized in that the lanthanum oxide content is >0% to 10% based on the weight of the respective cerium/zirconium/rare earth metal mixed oxide.

10. Catalytic converter according to claim 1, characterized in that the at least one platinum group metal is selected from the group consisting of platinum, palladium, rhodium or mixtures thereof.

11. Catalytic converter according to claim 1, wherein the second cerium/zirconium/rare earth metal mixed oxide is doped not only with lanthanum oxide but also with a further metal oxide from the group of rare earth metal oxides.

12. Catalytic converter according to claim 1, wherein the second cerium/zirconium/rare earth metal mixed oxide is doped not only with lanthanum oxide but also with praseodymium.

13. Catalytic converter for removing carbon monoxide, hydrocarbons and nitrogen oxides from the exhaust gas of internal combustion engines operated with stoichiometric air-fuel mixture, comprising a ceramic through-flow substrate of length L and a catalytic coating, characterized in that
the coating is located on the walls of the substrate and extends from one end of the substrate over a length of at least 50% of L and has active aluminum oxide, at least two cerium/zirconium/rare earth metal mixed oxides that differ from one another and at least one platinum group metal, and the first cerium/zirconium/rare earth metal mixed oxide has a weight ratio of cerium oxide to zirconium oxide of 0.7 to 0.1, which is smaller than in the second cerium/zirconium/rare earth metal mixed oxide, which has a cerium oxide to zirconium oxide weight ratio of 0.5 to 1.5, and wherein the first cerium/zirconium/rare earth metal mixed oxide is doped with yttrium oxide in addition to lanthanum oxide.

14. Catalytic converter according to claim 13, wherein the second cerium/zirconium/rare earth metal mixed oxide is doped not only with lanthanum oxide but also with a further metal oxide from the group of rare earth metal oxides.

15. Catalytic converter according to claim 13, wherein the second cerium/zirconium/rare earth metal mixed oxide is doped not only with lanthanum oxide but also with praseodymium.

16. Catalytic converter for removing carbon monoxide, hydrocarbons and nitrogen oxides from the exhaust gas of internal combustion engines operated with stoichiometric air-fuel mixture, comprising a ceramic through-flow substrate of length L and a catalytic coating, characterized in that
- the coating is located on the walls of the substrate and extends from one end of the substrate over a length of at least 50% of L and has active aluminum oxide, at least two cerium/zirconium/rare earth metal mixed oxides that differ from one another and at least one platinum group metal, and the first cerium/zirconium/rare earth metal mixed oxide has a weight ratio of cerium oxide to zirconium oxide of 0.7 to 0.1, which is smaller than in the second cerium/zirconium/rare earth metal mixed oxide, which has a cerium oxide to zirconium oxide weight ratio of 0.5 to 1.5, and wherein
- the second cerium/zirconium/rare earth metal mixed oxide is doped not only with lanthanum oxide but also with a further metal oxide from the group of rare earth metal oxides.

17. Method for removing carbon monoxide, hydrocarbons and nitrogen oxides from the exhaust gas of combustion engines operated with stoichiometric air-fuel mixture, characterized in that the exhaust gas is conducted through a catalytic converter in accordance with claim 1.

* * * * *